Aug. 2, 1932.  G. WALTHER  1,869,635
WHEEL
Filed May 11, 1929  4 Sheets-Sheet 1

INVENTOR
GEORGE WALTHER.

BY Toulmin + Toulmin
ATTORNEYS

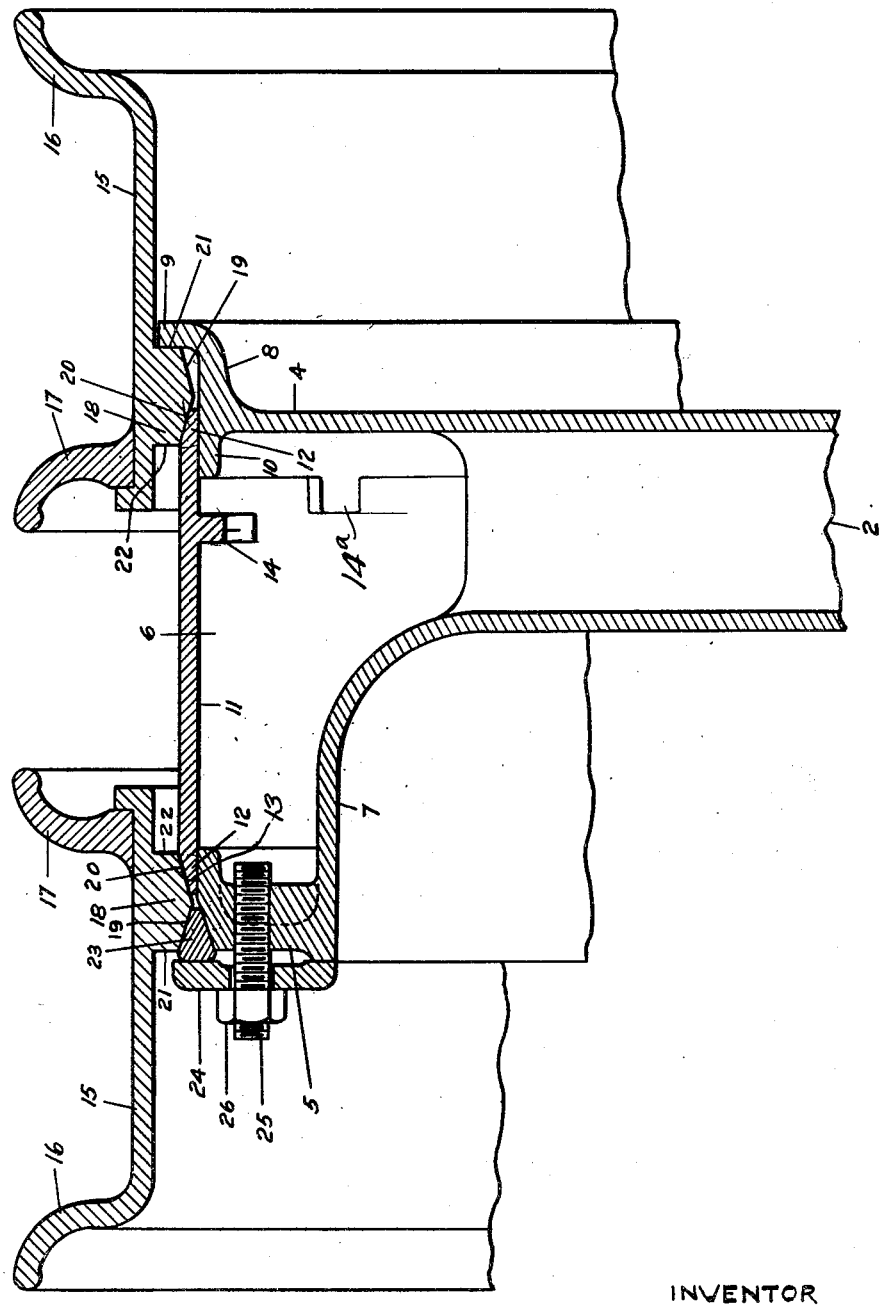

Aug. 2, 1932.  G. WALTHER  1,869,635

WHEEL

Filed May 11, 1929    4 Sheets-Sheet 3

INVENTOR
GEORGE WALTHER.

BY Toulmin & Toulmin
ATTORNEYS

Aug. 2, 1932.  G. WALTHER  1,869,635
WHEEL
Filed May 11, 1929  4 Sheets-Sheet 4
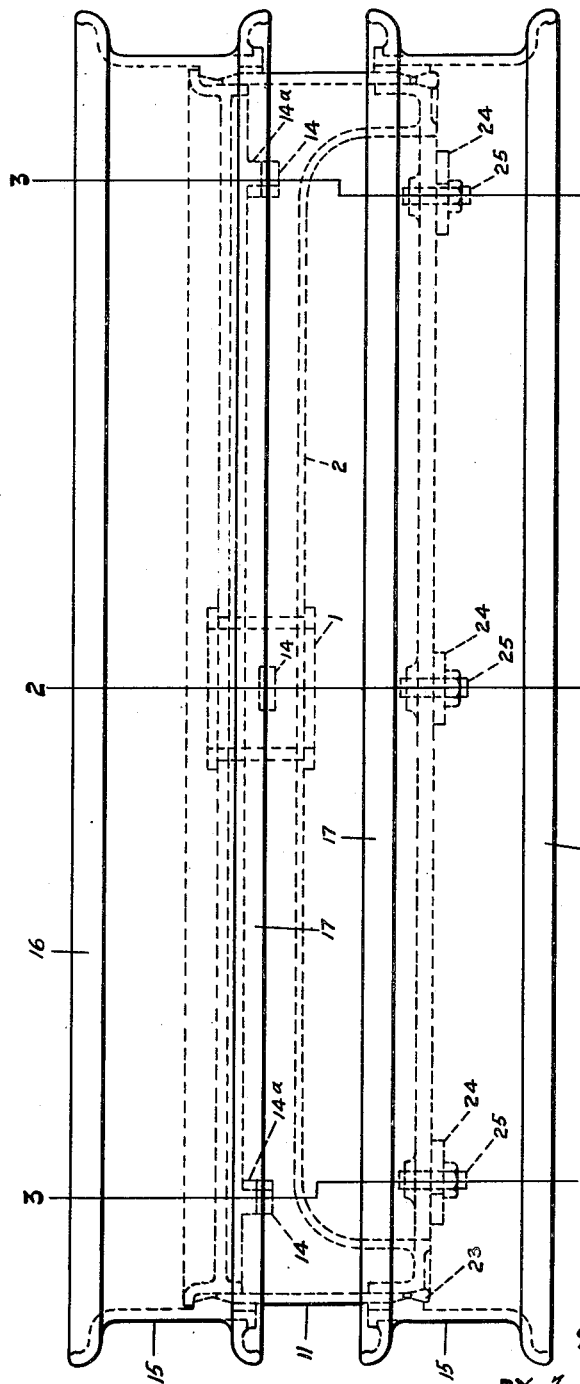
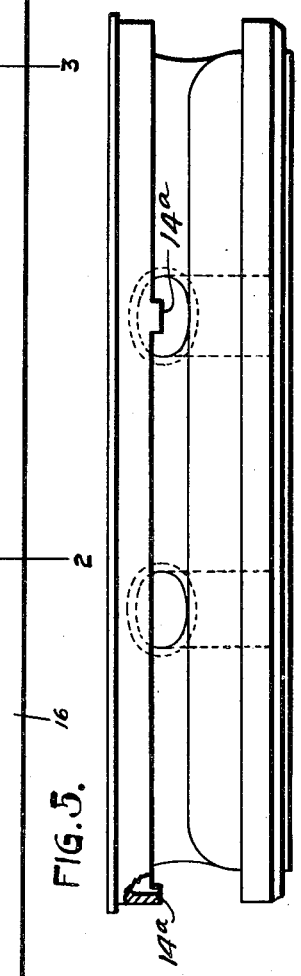
INVENTOR
GEORGE WALTHER
BY Toulmin + Toulmin
ATTORNEYS Patented Aug. 2, 1932

1,869,635

UNITED STATES PATENT OFFICE

GEORGE WALTHER, OF DAYTON, OHIO, ASSIGNOR TO THE DAYTON STEEL FOUNDRY COMPANY, OF DAYTON, OHIO, A CORPORATION OF OHIO

WHEEL

Application filed May 11, 1929. Serial No. 362,226.

My invention relates to wheels.

It is the object of my invention to provide a wheel with a single set of spokes which is adaptable for mounting either a single tire rim or a dual tire rim without modification.

It is a further object to provide a combined spacer and wedge ring which closes the ends of the spokes and acts as a felloe ring. This ring is adaptable for use either with a wheel having an integral cast felloe or a wheel with a hub and spokes having free ends and no felloe, in which event the spacing and wedging ring serves as a felloe ring.

It is an additional object to provide a universal wedging ring which can be used with either a single or dual rim construction.

Referring to the drawings:

Figure 2 is a section on the line 2—2 thereof with a dual rim in position;

Figure 4 is a plan view of the wheel with two rims mounted.

Fig. 5 is a plan view of the wheel body, and

Figure 1:
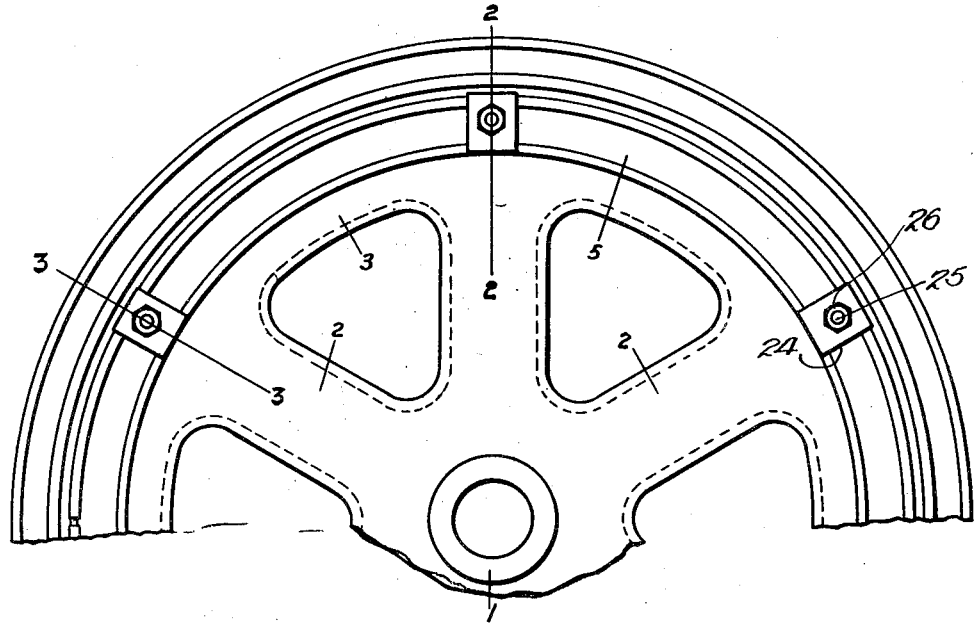
Figure 1 is a fragmentary view in side elevation of a wheel of the integral spoke and felly type illustrating my invention applied thereto.
Figure 6:
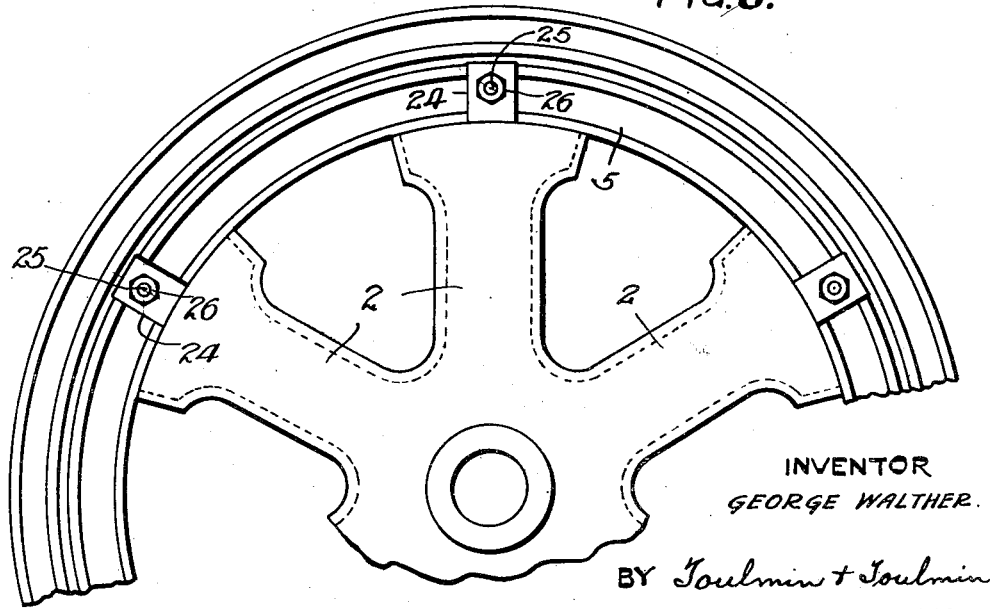
Fig. 6 is a fragmentary view illustrating the invention applied to the free spoke type of wheel.
Figure 3:
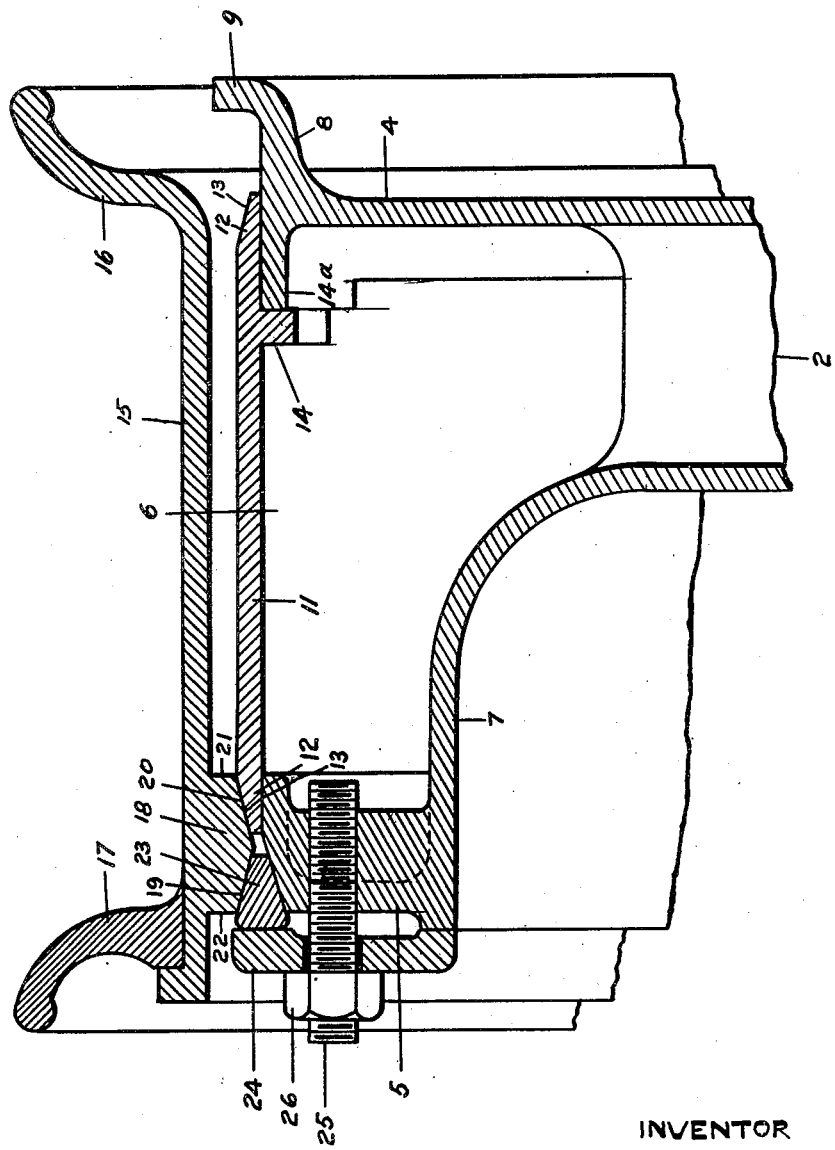
Figure 3 is a similar view, with a single rim in position, on the section 3—3 of Figure 1 or Figure 4.

Referring to the drawings in detail, 1 is a hub of a wheel having a plurality of spokes 2 which merge into and form part of a wheel body periphery. This wheel body periphery is provided with an inside wall 4 and an outside wall 5 forming an annular box-like structure communicating with the open ends of the spokes and open at the top as at 6. The box-like structure is projected laterally and supported by the arches 7 of the spoke ends while the rear walls of the spokes are straight. The laterally inward wall of the body periphery is turned over as at 8 with a shoulder 9 formed thereon. It is also turned laterally toward the outboard side to form a flange as at 10. On this flange rests one side of the annular felloe spacer and wedge ring 11. This ring is provided with tapered shoulders 12 having tapered surfaces 13 and with inwardly spaced depending lugs 14. The spacer and wedge ring 11 may be split to facilitate its removal from the wheel and the placing of it upon the wheel.

The tire rim is designated 15 having a tire retaining portion 16 integrally formed therewith and a detachable tire retaining portion 17.

The under side of this rim is provided with an annular shoulder 18 having double tapered faces 19 and 20. This annular shoulder member has side faces 21 and 22.

As shown in Figure 2, the inside tire rim is like the outside tire rim except they are reversed in position.

The outside tire rim has its face 19 of its annular shoulder engaged by the triangular shaped continuous split wedge ring 23. It is in turn engaged on its outside face by the series of clamping lugs 24 held in position by the bolts 25 and nuts 26.

Every other spoke has its flange 10 extended laterally to form a shoulder 14a for engaging with the depending lug 14 which latter lug is carried by the wedge ring 11.

These lugs 14 are positioned to engage the shoulders 14a when the single rim is used in order to provide an abutment for locating the spacer ring 11 which is taking the wedging thrust of the tire rim 15.

When two rims are used, this is not necessary because the wedging thrust is received by the shoulder 9 of the spoke.

A rotation of the ring 11 will determine whether its lugs 14 will engage the shoulders 14a.

It will be understood that I desire to comprehend within my invention such modifications as may be necessary to adapt it to varying conditions and uses.

No claim is made herein to the subject matter of the invention claimed in my copending application, Serial No. 383,646, filed August 5, 1929.

Having thus fully described my invention, what I claim as new and desire to secure by Letters Patent, is:

1. In a wheel, the combination of a wheel body having laterally extending shoulders at spaced points on the periphery thereof, and a ring mounted on said wheel body and having depending lugs adapted to engage with the laterally extending shoulders when the ring is positioned with the depending lugs against said laterally extending shoulders to prevent lateral displacement of said ring, said ring being adapted for rotational movement in respect to the wheel body to disengage the said depending lugs from the laterally extending shoulders to thus position the ring for permitting lateral displacement thereof in respect to said wheel body, the said ring when in position with the lugs against the shoulders being adapted to act as a support for a single rim, and when in position with the lugs free from said shoulders being adapted to act as a spacer for dual rims.

2. In a wheel, the combination of a wheel body having shoulders at spaced points on the periphery thereof, and a ring mounted on said wheel body and having lugs adapted to engage with the shoulders when the ring is positioned with the lugs against the shoulders to prevent lateral displacement of the spacer ring, said ring being adapted for rotational movement in respect to the wheel body to disengage the lugs from the shoulders to thus position the ring for permitting lateral displacement thereof in respect to the wheel body, the said ring when in position with the lugs against the shoulders being adapted to act as a support for a single rim, and when in position with the lugs free from said shoulders being adapted to act as a spacer for dual rims.

3. In combination with a wheel body having spokes, of means for mounting a rim thereon in either of two different relative positions, comprising a spacer ring having rim-engaging seats thereon, a tire-carrying rim having an annular lug arranged adjacent one edge thereof, said lug having seats thereon either of said seats adapted to engage a seat on said ring, and means engaging the other of said seats on said lug and the wheel body for securing the rim to the wheel in either of said relative positions.

4. In combination with a wheel body, of means for mounting a rim thereon in either of two different relative positions, comprising a spacer ring having rim-engaging seats thereon, a tire-carrying rim having an annular lug arranged adjacent one edge thereof, said lug having seats thereon either of which is adapted to engage a seat on said ring, means engaging the other of said seats on said lug and the wheel body for securing the rim to the wheel in either of said relative positions, said spacer ring and wheel body having means thereon adapted to be selectively relatively positioned to prevent axial inward movement of said ring, and to be also so relatively positioned as to permit said axial inward movement, whereby under said last condition said spacer ring is adapted to secure an inboard tire-carrying rim to the wheel body.

5. In combination with a wheel body having spokes, of means for mounting a rim thereon in either of two relative positions, comprising a spacer ring, means formed on the spacer ring and wheel body adapted for relative engagement to hold said spacer ring against axial inward movement of the spacer ring when the latter is in a predetermined position relative to the wheel body, and in all other positions of said ring such inward movement is permitted, whereby in the first-mentioned position a single tire-carrying rim can be mounted on the wheel in centered relation thereto, and in said latter-mentioned position a pair of rims arranged parallel can be mounted on said wheel and said spacer ring will act as means to secure the inboard of said rims to the wheel.

In testimony whereof, I affix my signature.

GEORGE WALTHER.